(12) United States Patent
Cornelissen et al.

(10) Patent No.: US 8,246,233 B2
(45) Date of Patent: Aug. 21, 2012

(54) ILLUMINATION SYSTEM FOR ILLUMINATING A DISPLAY DEVICE, AND DISPLAY DEVICE

(75) Inventors: Hugo Johan Cornelissen, Eindhoven (NL); Fetze Pijlman, Eindhoven (NL); Chun-ho Chen, Changhua (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 376 days.

(21) Appl. No.: 12/671,716

(22) PCT Filed: Aug. 4, 2008

(86) PCT No.: PCT/IB2008/053103
§ 371 (c)(1),
(2), (4) Date: Feb. 2, 2010

(87) PCT Pub. No.: WO2009/019646
PCT Pub. Date: Feb. 12, 2009

(65) Prior Publication Data
US 2011/0221361 A1    Sep. 15, 2011

(30) Foreign Application Priority Data

Aug. 8, 2007  (EP) .................................... 07113993

(51) Int. Cl.
*F21V 7/04* (2006.01)

(52) U.S. Cl. ........ 362/612; 362/613; 362/625; 362/626; 362/97.1

(58) Field of Classification Search ........ 362/97.1–97.3, 362/606–607, 612–613, 617–620, 623–627, 362/311.01–311.02, 355, 360; 349/62–65
See application file for complete search history.

(56) References Cited

U.S. PATENT DOCUMENTS

| | | | |
|---|---|---|---|
| 5,883,684 A | 3/1999 | Millikan et al. | |
| 6,464,367 B2 | 10/2002 | Ito et al. | |
| 6,580,477 B1* | 6/2003 | Cho | 349/65 |
| 6,927,812 B2* | 8/2005 | Cho | 349/65 |
| 6,986,600 B2 | 1/2006 | Yamada et al. | |
| 7,728,923 B2* | 6/2010 | Kim et al. | 349/65 |
| 8,092,064 B2* | 1/2012 | Erchak et al. | 362/613 |
| 2005/0168967 A1* | 8/2005 | Kao et al. | 362/27 |
| 2005/0276069 A1 | 12/2005 | Taniguchi et al. | |
| 2006/0002146 A1 | 1/2006 | Baba | |
| 2006/0221638 A1 | 10/2006 | Chew et al. | |
| 2007/0058393 A1 | 3/2007 | Kim et al. | |
| 2007/0159849 A1 | 7/2007 | Sakai | |

* cited by examiner

*Primary Examiner* — Thomas Sember
(74) *Attorney, Agent, or Firm* — Mark L. Beloborodov

(57) ABSTRACT

Display devices are used in portable computer systems, imaging systems, and other electronic devices. Many of these display devices require a source of light to illuminate a display screen. The invention relates to an illumination system for illuminating said display devices. The invention also relates to a display device provided with such an illumination system.

14 Claims, 2 Drawing Sheets

ILLUMINATION SYSTEM FOR ILLUMINATING A DISPLAY DEVICE, AND DISPLAY DEVICE

FIELD OF THE INVENTION

The invention relates to an illumination system for illuminating display devices. The invention also relates to a display device provided with such an illumination system.

BACKGROUND OF THE INVENTION

Display devices are used in portable computer systems, imaging systems, and other electronic devices. Many of these display devices require a source of light to illuminate a display screen. One example of a non-emissive display device that requires an external source of light is a liquid crystal display ("LCD"). LCDs typically include a liquid crystal layer containing liquid crystals which operate as light valves, allowing transmission of light in one state and blocking transmission of light in a second state. Placing a source of light or backlight behind the liquid crystal display and electronically controlling the switching of the light valves allows a user to view the front of the LCD to read text or images formed by the switched light valves. LCDs have become very popular in portable computing applications because they are rugged and require little space to operate. Moreover, LCDs are becoming increasingly popular for television applications.

Since last decade, due to technological breakthroughs, LEDs have become more and more important in lighting applications. A new dimmable backlight concept has been developed in which LEDs are driven by fast modulation, as a result of which the LEDs generate only the amount of light required for illuminating the image content. In this dimmable backlight concept, LEDs can selectively be switched on and off. The dimmable backlight overcomes the LCD's drawback of leakage light in dark areas of images and improves the contrast of the LCD. Backlight modulation can be achieved on the total backlight (0D-dimming), along horizontal segments (1D-dimming) or along horizontal and vertical segments (2D-dimming) using a matrix of individually addressable LEDs. The application of a conventional light guide design makes the boundary too sharp and not suitable to act as a segment or tile in a dimmable backlight application. At present, a straightforward manner to provide a dimmable illumination system driven by LEDs is to apply an illumination system comprising multiple LEDs positioned at a distance from an optical foil, wherein the LEDs are adapted to directly light the optical foil. A control unit is applied to selectively switch on and off the respective LEDs to enable selective dimming of the illumination system. To secure a substantially homogenous illumination of the optical foil, the distance, formed by an air gap, between the LEDs and the optical foil must be sufficiently large. Commonly the minimum thickness of the air gap is approximately equal to the pitch of the LEDs, wherein the pitch is defined as the distance between neighbouring LEDs. Since the minimum thickness is commonly between 2 and 5 cm, the known illumination system is relatively voluminous. There is, however, a permanent need to (further) reduce the thickness of the known illumination system, which may be used as a dimmable backlight unit.

It is an object of the invention to provide a relatively compact LED driven illumination system which is adapted to emit a relatively uniform light profile and which may be applied as a dimmable illumination system.

SUMMARY OF THE INVENTION

This object can be achieved by providing an illumination system according to the preamble, comprising: multiple translucent tiles, each translucent tile being provided with reflecting means for reflecting light towards an outcoupling surface of the tile, and multiple arrays of one or multiple light emitting diodes (LEDs), each array of LEDs being arranged to emit light substantially directed towards at least one translucent tile, the reflecting means being adapted to reflect light towards at least one outcoupling surface of the tile facing a light receiving surface positioned at a distance from the tiles, said reflection being such that light emitted by at least two tiles is mixed at least partially before being received by said light receiving surface. By applying multiple translucent tiles (or translucent segments), a dimmable illumination system can be realised, wherein the tiles can be selectively (partial dimming) and even integrally (total dimming) switched on and off depending on the image content. Since light emitted by one or multiple tiles is mixed at least partially with light emitted by at least one other tile in the space between the tiles and the light receiving surface, a relatively uniform (homogeneous) illumination of the light receiving surface and hence of a display device to be illuminated can be realised. In addition, partial mixing between tiles leads to smooth light distributions on a non-emissive display device, which is favourable for avoiding visible artefacts. The light receiving surface is commonly substantially flat, and is preferably formed by an optical redirection structure which may be part of the illumination system and/or of the display device to be illuminated. The optical redirection structure is adapted to redirect light emitted by the tiles in the direction of a display device to be illuminated to secure a proper and uniform illumination of said display device. The optical redirection structure may be adapted either to redirect received light in a predefined direction or to redirect light in a more diffuse (random) direction towards the display device to be illuminated. To allow mixing in the space between the tiles and the redirection structure, an angular emission of light emitted by the tiles will commonly be beneficial, wherein preferably at least a substantial part of the light emitted by the tiles is emitted in a direction enclosing an angle of at least 45 degrees with a normal to the light receiving surface, in particular the redirection structure. Hence, it is beneficial that the tiles are adapted to emit light in a direction enclosing an angle with a receiving surface of the optical redirection structure. Due to this angular distribution of light, the thickness of the space between the tiles and the redirection structure, and hence the thickness of the illumination system as such, can be reduced significantly compared to the thickness of known illumination systems. It has been shown that the thickness of the space between the tiles and the redirection structure can be reduced to several millimetres. Commonly, it is also advantageous that each tile is adapted to emit light in a direction enclosing an angle of between 0 and 90 degrees with a normal to an outcoupling surface of said tile. In this manner the length of the transport path of the light between the tiles and the redirection structure can be further increased, which may result in a (further) reduction of the thickness of the space between the tiles and the redirection structure. Beside conventional LEDs also Organic LEDs (OLEDs) may be used in the illumination system according to the invention. Application of OLEDs could be interesting, since the application of OLEDs provides an increased degree of freedom of design of the illumination system according to the invention. Herein, it is conceivable to apply OLED strips or other elongated OLEDs to illuminate the tiles.

In a preferred embodiment at least one tile is illuminated by at least two arrays of LEDs. In this manner the number of tiles to be applied in the illumination system can be reduced, which is favourable from an economical point of view. The multiple arrays of LEDs may be positioned in line. In a particular preferred embodiment, the arrays of LEDs are arranged to emit light substantially towards different, more preferably opposing, incoupling surfaces of the translucent tile. Preferably, at least one translucent tile comprises multiple outcoupling surfaces, wherein at least two outcoupling surfaces mutually enclose an angle to facilitate angular distribution of light into the space defined between the tiles and the redirection structure. In this embodiment, the LEDs are commonly positioned relatively far from the corresponding outcoupling surface, as a result of which a satisfying light distribution can be achieved.

Commonly, each array of LEDs comprises at least one LED emitting red light, at least one LED emitting green light, and at least one LED emitting blue light. Hence, it is favourable if each translucent tile is sufficiently large to allow mixing of different light colours emitted by LEDs belonging to an array before being emitted by said tile. In this manner, emission of the desired (mixed) light colour by the tiles can be secured. Also other types of LEDs, such as white LEDs, can be used. It is explicitly noted that an array of LEDs may also comprise merely a single LED, though commonly each array of LEDs comprises multiple LEDs.

Preferably, the reflecting means is applied to a (reflective) surface of each tile directed away from the optical redirection structure. By positioning the reflection means at a surface of the tile directed away from the redirection structure, an effective reflection can be achieved. Reflecting light within the tile can be realised in various manners. It has been found beneficial to apply a patterned or profiled reflective surface, wherein the reflective surface may be provided by a reflective gravure or a reflective tooth structure. In this embodiment, the reflecting means are at least partially integrated with the respective tiles. In an alternative preferred embodiment, the reflecting means comprises a specular mirror (silver mirror) and/or diffuse mirror (white mirror). In this manner, light contained by the tiles can also be reflected in an efficient manner. In a particular preferred embodiment, the tooth structure is at least partially positioned at a (bottom) surface of a tile which is substantially parallel to an outcoupling surface of said tile. It has been revealed that this embodiment commonly employs a favourable illumination of a display device. It is also conceivable to apply reflecting means being positioned near (at a small distance from) the tiles to achieve a desired reflection. Commonly, light coupled into a tile will also be reflected by one or multiple (other) surfaces defining said tile. More in particular, light coupled into a front side of a tile will commonly at least partially be reflected or refracted by a rear side, opposite said front side, of the tile and will subsequently be reflected by the reflecting means in the desired direction. It will be clear that the direction of reflection of light as reflected by the reflection means depends on the angle of incidence of the light.

The space between the tiles and the redirection structure may be filled up with various materials, such as a translucent polymer or an inert gas. However, preferably this space is filled with air, which is favourable from a practical and economical point of view. As mentioned above, the air gap is preferably sufficiently thick to allow a substantially homogeneous illumination of the optical redirection structure. It has been found that the shortest distance between the translucent tiles and the optical redirection structure is commonly preferably at least 3 mm to secure a relatively uniform (homogeneous) illumination of the optical redirection structure.

In a preferred embodiment, the optical redirection structure is provided with an extraction structure for extracting light from the illumination system according to the invention in the direction of a display device to be illuminated. The redirection structure may comprise e.g. a diffuse dot pattern, micro-optical structures, such as micro-prisms, volume holograms, surface gratings, cholesteric network polymer, and optically anisotropic micro-structured layers. The above optical structure preferably comprises one or more optical foils. In this manner, radiation received by the redirection structure can be redirected and extracted in the direction of the display device in an optimal manner to secure proper and uniform illumination of the display device.

To provide a dimmable illumination system, the illumination system preferably comprises a control unit for selectively switching on and off the respective translucent tiles, and in particular the array of LEDs adapted to illuminate said tiles. The control unit or backlight driver is adapted for driving the segments of the illumination system. The fact that the backlight driver can drive the tiles (segments) of the illumination system according to the invention, allows all tiles to be driven in parallel as well as individual tiles to be driven separately. The dimmable backlight overcomes the LCD's drawback of leakage light in dark areas of images and improves the contrast of the LCD. Moreover, selectively switching off one or multiple tiles commonly leads to a (considerable) saving of energy. Backlight modulation can be achieved on the total backlight (0D-dimming), along horizontal segments (1D-dimming) or along horizontal and vertical segments (2D-dimming), using a matrix of individually addressable LEDs. Although the illumination system according to the invention is suitable to be dimmed position-selectively, no visible (shifted) boundaries between tiles will be present during dimming due to the favourable construction of the illumination system as mentioned above, as a result of which a reliable and accurate illumination of a display device can be secured. Beside position-selective dimming (partial dimming), it is also imaginable to realise complete dimming of the illumination system by means of the control unit. Commonly, the control unit is also coupled to a display device to be illuminated in order to adjust the control of the illumination system and the display device depending on the content image to be shown on the display device.

In a preferred embodiment at least two translucent tiles, and more preferably all tiles, are mutually connected. In this manner the mutual predefined orientation of the tiles can be preserved in a relatively simple manner. Moreover, this facilitates assembling of the illumination system according to the invention. By means of grooves or sleeves between the tiles, the tiles can be separated from each other optically and hence defined.

The invention also relates to a display device comprising an illumination system according to the invention. Besides Liquid Crystal Displays (LCD) all kinds of displays can be used which require active illumination by an external illumination system according to the invention. However, it must be clear that the illumination system may also be used for other purposes. To this end, the illumination system may for example also be used for direct lighting, or may be applied in light boxes or as part of tanning equipment.

BRIEF DESCRIPTION OF THE DRAWINGS

The invention can further be illustrated by way of the following non-limitative embodiments, wherein.

DETAILED DESCRIPTION OF THE EMBODIMENTS

Figure 1:
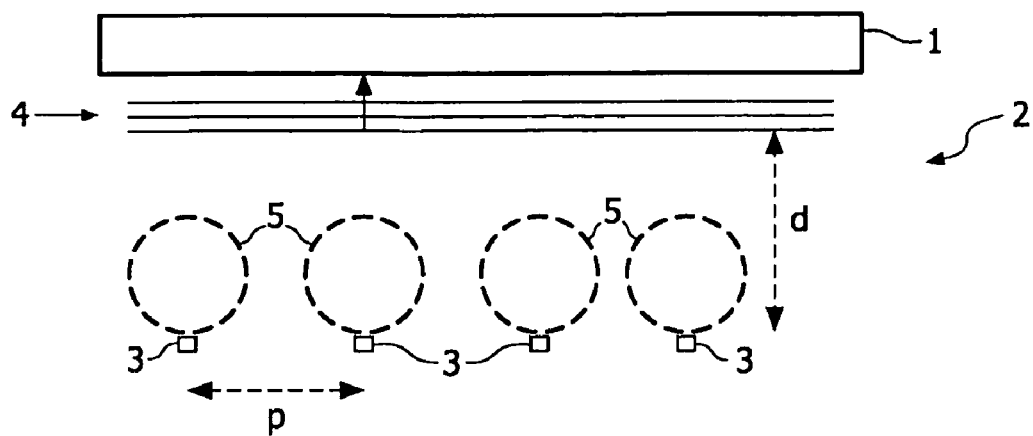
FIG. 1 shows a side view of a display device comprising an illumination system known from the prior art.

FIG. 1 shows a side view of a display device 1, such as an LCD, comprising an illumination system 2 known from the prior art. The known illumination system 2 comprises multiple LEDs 3 being positioned equidistantly from a stack of optical foils 4. Light 5 emitted by the LEDs 3 and received by the stack of optical foils 4 will partially be redirected as shown in the direction of the display device 1 and partially be reflected back towards the LEDs 3. The LEDs 3 can be selectively switched on and off, which enables dimming of the illumination system 2. To achieve a relatively uniform illumination of the display device 1, the LEDs 3 are positioned at a minimum distance d from the stack of optical foils 4, wherein d is at least approximately equal to or larger than the mutual distance p (pitch) between the LEDs 3, as a result of which the known illumination system 2 is relatively voluminous. Commonly the distance d (and the pitch p) will be between 2 and 5 cm.

Figure 2A:
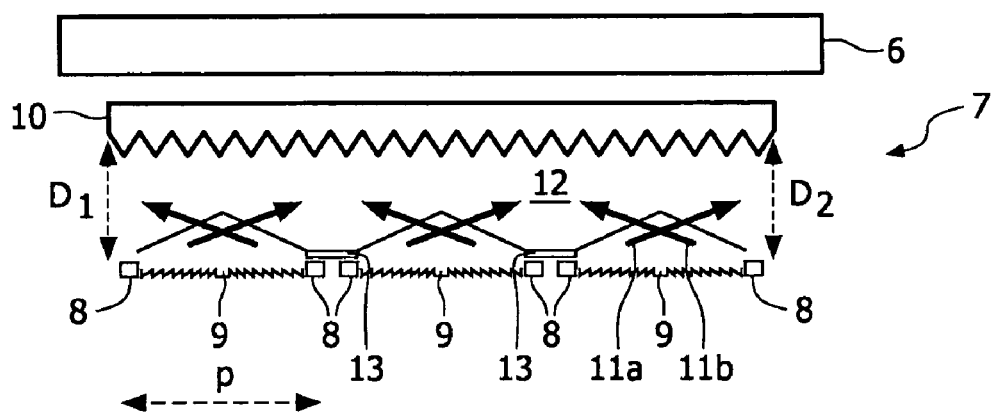
FIG. 2a shows a side view of a display device comprising an illumination system according to the invention.

FIG. 2a shows a side view of a display device 6, such as an LCD, comprising an illumination system 7 according to the invention. The illumination system 7 comprises multiple arrays 8 of LEDs (merely a single LED of each array 8 is shown in this Figure), wherein translucent (light guiding) tiles 9 are positioned in between said arrays 8. The tiles 9 are adapted to mix light from an array 8 of LEDs, to reflect the (mixed) light and to emit the light into the direction of a redirection structure 10 being positioned at a distance $D_1$ from the tiles 9. In order to reflect the light in the desired direction, each tile 9 is provided with multiple saw profiles 11a, 11b. As shown, light is coupled out of the tiles 9 in an angular manner, which means that the light emitted by the tiles 9 and by the redirection structure 10 mutually enclose a (relatively small) angle which is commonly less than 45°. In an air gap 12, defined between the tiles 9 and the redirection structure 10, light originating from different arrays 8 of LEDs will be mixed at least partially to secure uniform (symmetric) illumination of the redirection structure 10, and hence of the display device 6. The arrays 8 of LEDs will be separated from the air gap 12 by means of a reflector 13 to prevent the arrays 8 of LEDs from directly illuminating the redirection structure 10. The (largest) pitch P between neighbouring arrays 8 of LEDs is kept equal to the pitch p shown in FIG. 1. As shown in this Figure, the distance $D_2$ between the arrays 8 of LEDs and the redirection structure 10 is substantially smaller than the corresponding distance d as shown in FIG. 1. In most cases, the distance $D_2$ will be between 6 and 15 mm. Since the thickness of the tiles 9 is typically about 3 mm, the thickness $D_1$ will be between 3 and 12 mm. The arrays 8 of LEDs can be mounted directly onto a printed circuit board (PCB) and the resultant LED placement is such as the light profiles of the different arrays 8 overlap each other in the air gap 12. Notwithstanding the fact that a relatively uniform illumination of a display device 6 can be achieved in a relatively effective manner by way of the embodiments described above, still a further disadvantage can occur while displaying images on the display device 6. When relatively fast moving image material is displayed on a display device 6, such as an active matrix LCD, the picture sometimes becomes blurred because of the so-called "sample and hold" effect and the slow response of the LC pixels. A scanning backlight creates a stroke of light that scrolls at the same speed as the row-addressing speed from top to bottom of the screen and reduces motion blur significantly, however not completely. To this end, the illumination system 7 preferably comprises multiple sections, each section containing multiple arrays 8 of LEDs, wherein the arrays 8 of each section are connected together by means of a distinctive channel. In this manner, the sections can be switched on and off row by row to improve the image quality displayed by the display device 6, such as an LCD.

Figure 2B:
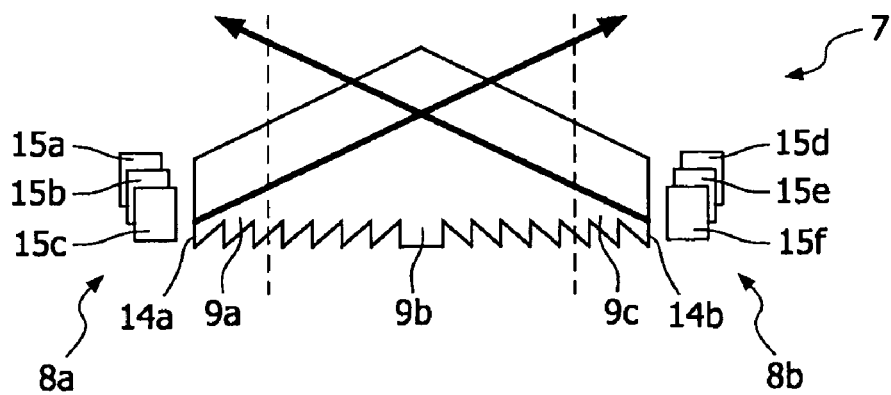
FIG. 2b shows a detailed view of a part of the illumination system as shown in FIG. 2a, FIG. 2c shows a top view of the illumination system as shown in FIG. 2a, and FIG. 3 shows a side view of another illumination system according to the invention.

FIG. 2b shows a detailed view of a part of the illumination system 7 as shown in FIG. 2a. In particular a tile 9 is shown, wherein at opposite incoupling surfaces 14a, 14b an array 8a, 8b of multiple LEDs 15a-f is shown, each array 8a, 8b comprising a red LED 15a, 15d, a green LED 15b, 15e, and a blue LED 15c, 15f. By means of the dashed lines it is shown that the peripheral areas 9a, 9c of the tile 9 form in particular a mixing area for light originating from an adjacent array 8a, 8b. A central area 9b of the tile 9 is in particular adapted for emission of light. The arrows merely indicate roughly the transport of light. In practice, light will be reflected within the tile 9, after which light is emitted by the tile 9 in a desired direction (as shown). Commonly the tiles 9 are made of a translucent polymer, such as PMMA.

Figure 2C:
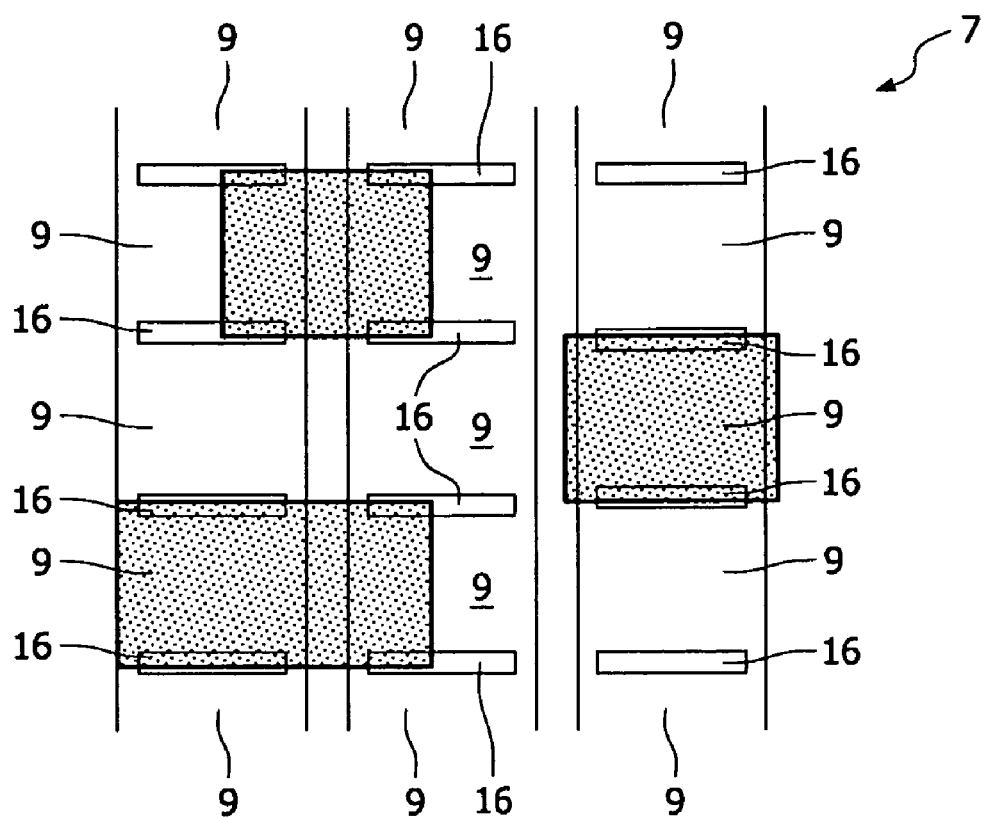

FIG. 2c shows a top view of the illumination system 7 as shown in FIG. 2a. In this Figure it is shown that multiple tiles 9 are connected together, wherein between neighbouring and mutually connected tiles 9 grooves 16 are applied to optically separate the tiles 9 in order to maintain a well-controllable, dimmable illumination system 7. By means of the shaded parts it is indicated that the geometry of the tiles 9 may differ and may be beyond a single physical tile 9, as shown in this Figure. The geometry of each optical tile, which may thus deviate from a physical tile 9, can be determined by selectively switching on particular arrays 8 of LEDs (not shown). For creating the upper optical tile (shown shaded), an array 8 of LEDs positioned on the left side with respect to a left physical tile 9, and an array 8 of LEDs positioned on the right side with respect to a middle physical tile 9 are switched on. For creating the middle optical tile (shown shaded), the arrays 8 of LEDs are switched on as shown in FIG. 2b. For creating the lower optical tile (shown shaded), arrays 8 of LEDs positioned on both sides of a left physical tile 9, and an array 8 of LEDs positioned on the right side with respect to the middle physical tile 9 are switched on. The definition of a single (optical) tile will commonly be relevant for operating and in particular dimming the illumination system 7.

Figure 3:
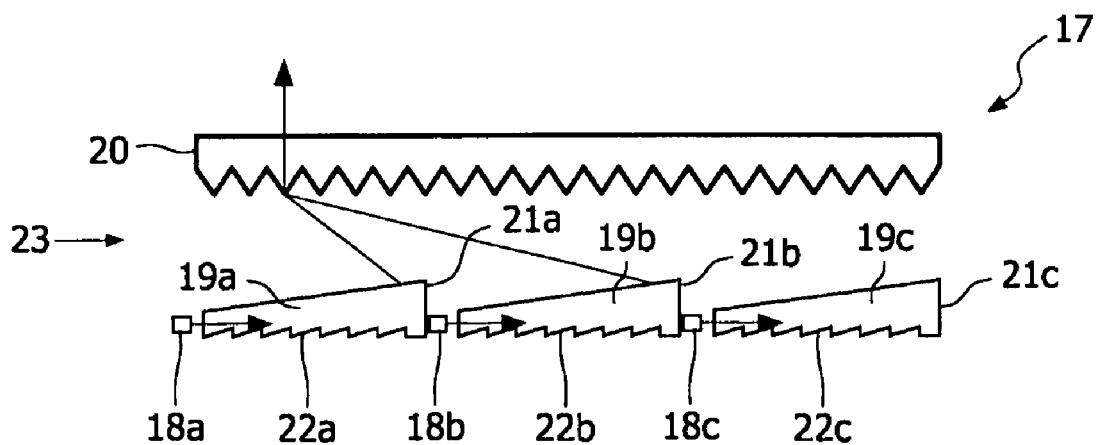

FIG. 3 shows a side view of another illumination system 17 according to the invention comprising multiple arrays 18a, 18b, 18c of LEDs, multiple light guiding tiles 19a, 19b, 19c, and a redirection structure 20 positioned at a distance from the tiles 19a, 19b, 19c. Light emitted by an array 18a, 18b, 18c of LEDs is coupled into an adjacent tile 19a, 19b, 19c (as shown by the arrows). In the direction from left to right, light emitted by a single array 18a, 18b, 18c will be mixed within the tile 19a, 19b, 19c. Within the tiles 19a, 19b, 19c light will be reflected at least partially by a back surface 21a, 21b, 21c and commonly a reflective (patterned) bottom surface 22a, 22b, 22c of the tile 19a, 19b, 19c, and will be coupled out of the tiles 19a, 19b 19c in an opposite direction (having a horizontal component from right to left). As shown in the Figure, light emitted by different arrays 18a, 18b, 18c will be mixed in an air gap 23 formed between the tiles 19a, 19b, 19c and the redirection structure 20 after which the light will be redirected by the redirection structure 20 towards a display device (not shown). In this manner visible boundaries between the tiles 19a, 19b, 19c can be eliminated and a relatively uniform illumination of the redirection structure 20 can be achieved.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. Illumination system for illuminating a display device, the illumination system comprising:
   multiple translucent tiles, each translucent tile comprising a reflecting means for reflecting light towards an outcoupling surface of the tile, and
   multiple arrays of one or multiple light emitting diodes (LEDs), each array of LEDs being arranged to emit light substantially towards at least one translucent tile,
      wherein the reflecting means are configured to reflect light towards at least one outcoupling surface of the tile facing a light receiving surface positioned at a distance from the tiles, said reflection being such that light emitted by at least two tiles is mixed at least partially before being received by said light receiving surface,
      wherein the reflecting means is provided at a surface of each tile directed away from the light receiving surface, and
      wherein the reflective surface comprises at least one reflective tooth structure.

2. Illumination system according to claim 1, characterized in that at least a substantial part of the light emitted by the tiles is emitted in a direction enclosing an angle of at least 45 degrees with a normal to the light receiving surface.

3. Illumination system according to claim 1, wherein light emitted by each tile is emitted in a direction enclosing an angle of between 0 and 90 degrees with a normal to an outcoupling surface of said tile.

4. Illumination system according to claim 1, wherein the light receiving surface is formed by an optical redirection structure forming part of the illumination system.

5. Illumination system according to claim 4, wherein the arrays of LEDs are arranged to emit light substantially towards different incoupling surfaces of the translucent tile.

6. Illumination system according to claim 1, wherein at least one tile is illuminated by at least two arrays (8) of LEDs (15, 18).

7. Illumination system according to claim 1, wherein at least one translucent tile comprises multiple outcoupling surfaces, wherein at least two outcoupling surfaces mutually enclose an angle.

8. Illumination system according to claim 1, wherein the reflecting means comprises a specular and/or diffuse mirror.

9. Illumination system according to claim 1, wherein the translucent tiles and the light receiving surface define a gap therebetween.

10. Illumination system according to claim 1, wherein the light receiving surface comprises multiple micro-prisms.

11. Illumination system according to claim 1, wherein the light receiving surface comprises at least one optical redirection foil.

12. Illumination system according to claim 1, wherein the illumination system comprises a control unit for selectively switching on and off the respective arrays of LEDs.

13. Illumination system according to claim 12, wherein the illumination system comprises a control unit for selectively switching on and off the arrays of LEDs, dependent on the image content of a display device to be illuminated.

14. Illumination system according to claim 1, wherein at least two translucent tiles are mutually connected.

* * * * *